(12) United States Patent
Johnston et al.

(10) Patent No.: US 9,553,915 B2
(45) Date of Patent: Jan. 24, 2017

(54) METHOD AND SYSTEM FOR IMPLEMENTING COMMANDS

(71) Applicant: CA, Inc., Islandia, NY (US)

(72) Inventors: Eugene E. Johnston, Pittsburgh, PA (US); Jan Podrouzek, Prague (CZ)

(73) Assignee: CA, Inc., New York, NY (US)

( * ) Notice: Subject to any disclaimer, the term of this patent is extended or adjusted under 35 U.S.C. 154(b) by 542 days.

(21) Appl. No.: 13/648,908

(22) Filed: Oct. 10, 2012

(65) Prior Publication Data

US 2014/0101532 A1   Apr. 10, 2014

(51) Int. Cl.
*G06F 17/00* (2006.01)
*H04L 29/08* (2006.01)
*G06F 17/30* (2006.01)

(52) U.S. Cl.
CPC ....... *H04L 67/025* (2013.01); *G06F 17/30194* (2013.01)

(58) Field of Classification Search
CPC ............ G06F 21/6218; G06F 17/30115; G06F 17/30194

USPC ......................................................... 715/234
See application file for complete search history.

(56) References Cited

U.S. PATENT DOCUMENTS

| | | | |
|---|---|---|---|
| 2002/0147645 A1* | 10/2002 | Alao et al. ...................... | 705/14 |
| 2003/0172196 A1* | 9/2003 | Hejlsberg et al. ............ | 709/328 |
| 2004/0093407 A1* | 5/2004 | Sample .......................... | 709/224 |
| 2009/0300431 A1* | 12/2009 | Ahn ................................ | 714/48 |
| 2010/0293385 A1* | 11/2010 | Nanda et al. ................. | 713/176 |

* cited by examiner

*Primary Examiner* — Andrew McIntosh
(74) *Attorney, Agent, or Firm* — Baker Botts L.L.P.

(57) ABSTRACT

A method for implementing commands includes storing data defining command operations in a memory. The data defining command operations include a hierarchy of Uniform Resource identifiers (URIs) and Extensible Markup Language (XML) document schema defining XML documents. The method also includes receiving a command request from a remote computer. The command request contains an URI and a Hypertext Transfer Protocol (HTTP) method. Further, the method includes determining a command operation based on the data defining command operations stored in the memory and the command request received, and executing the command operation based on the command request.

16 Claims, 2 Drawing Sheets

METHOD AND SYSTEM FOR IMPLEMENTING COMMANDS

BACKGROUND

The present disclosure relates generally to methods and systems for implementing commands, and more specifically, to methods for implementing commands in a web service Application Programming Interface ("API").

BRIEF SUMMARY

The present disclosure relates generally to methods or systems that enable an application to request that a command be executed on a remote operating system by using a web service Application Programming Interface ("API").

According to an embodiment of the disclosure, a method for implementing commands includes storing data defining command operations in a memory. The data defining command operations include a hierarchy of Uniform Resource Identifiers (URIs) and Extensible Markup Language (XML) document schema defining XML documents. The method further includes receiving a command request including an URI and a Hypertext Transfer Protocol (HTTP) method; determining a command operation based on the data defining command operations stored in the memory and the command request received; and executing the command operation based on the command request.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
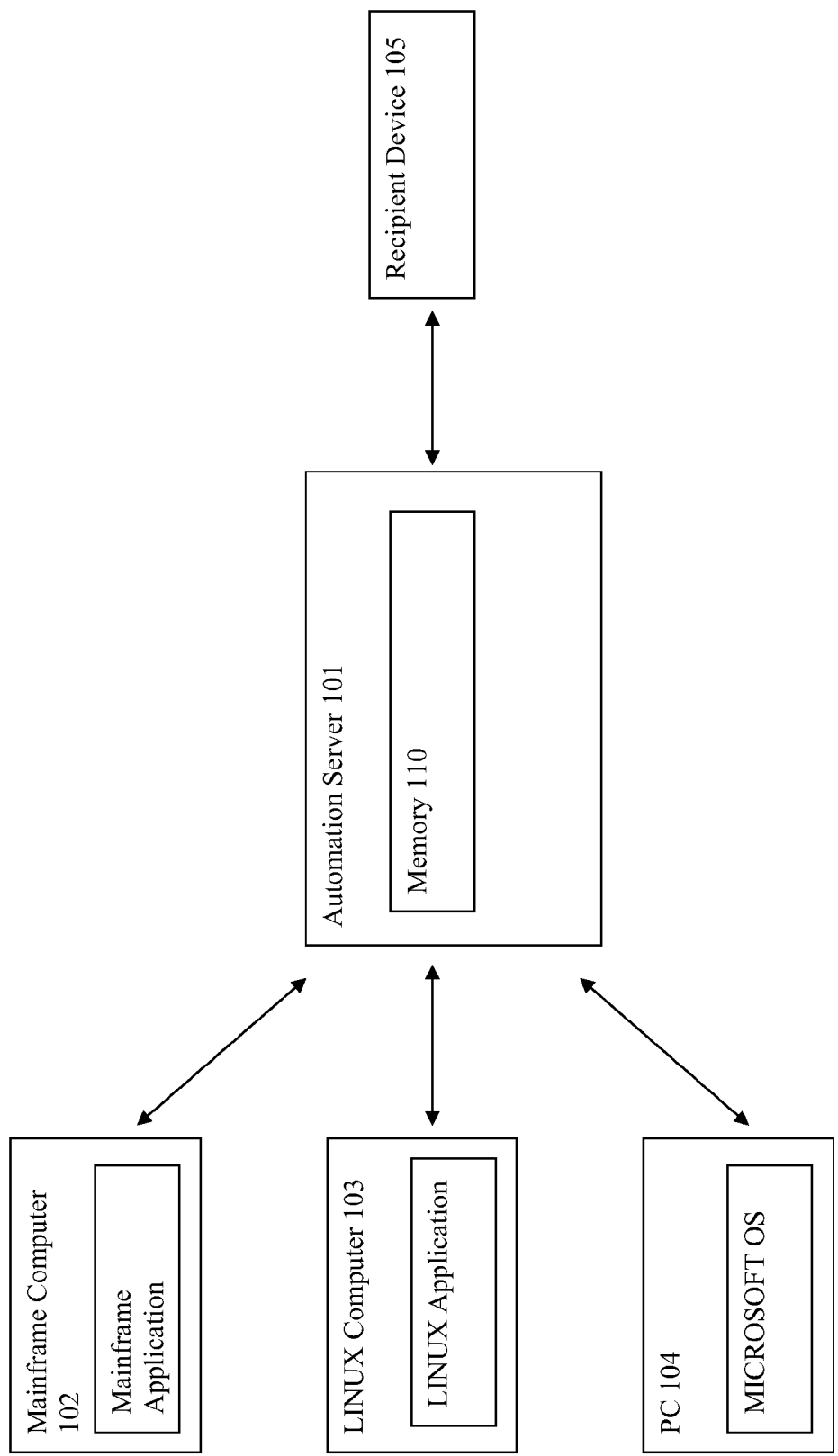
FIG. 1 is a diagram depicting a system for implementing commands according to an embodiment of the disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROW, an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA®, SCALA®, SMALLTALK®, EIFFEL®, JADE®, EMERALD®, C++, C#, VB.NET, PYTHON®, JAVASCRIPT® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY®, Groovy, JAVASCRIPT®, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Application solutions may involve programs running on different computers. Applications within a solution may trigger actions in other applications. The means by which this is accomplished may include file transfers, proprietary Transmission Control Protocol/Internet Protocol (TCP/IP) messaging, web service requests, and the like. Some of these methods may involve significant programming effort and a significant investment of time. Further, the communication mechanism may vary for different applications. One approach may be to run a command on the remote computer. The command may be an operating system command or a command line program that is part of a desired application. Nevertheless, these mechanisms for running a command remotely may have limitations. For example, programs such as Remote Shell (RSH) and Remote Execution (REXEC) may have security limitations. Although Secure Shell (SSH) protocol may implement security, SSH may (prompt a user for a password and may be inoperable in a lights-out programmatic solution, because no personnel is present to answer the prompt. Further, although passwords may be avoided by using SSH public-private keys, the keys may be specific to each user account on each specific computer. Thus, as the number of cooperating applications on different computers increases, the deployment may become excessively complex. Finally, all of the mechanisms discussed above may be available for UNIX-like operating systems, Windows, and Macintosh systems. These mechanisms may not be readily available for IBM mainframe systems or IBM i systems, e.g., AS400, and thus, excluding an entire class of computers.

A monitoring application that remotely monitors computer systems may establish sessions to all of the desired computers in a solution. The monitoring application may issue commands to the monitored computers on demand. However, without a means for remote applications to request that the monitoring application issue a command to one of its monitored systems, the monitoring application may not effectively provide its services to the other applications within a solution suite.

The present disclosure may enable a remote application to request that a command be executed on a remote operating system.

Referring to FIG. 1, a command implementing system may comprise an automation server 101 connected to a plurality of computers or devices via networks. For example, automation server 101 may be connected to one or more of a mainframe computer 102 that may execute a mainframe application, a LINUX computer 103 that may execute a LINUX operating system, and a PC computer 104 that may execute a MICROSOFT operating system. In another embodiment, automation server 101 may be connected to computers executing other types of operating systems, such as MAC operating system.

Automation server 101 may receive commands, messages, notifications, queries, or answers from one or more of mainframe computer 102, LINUX computer 103, and PC computer 104. For example, automation server 101 may receive a command to monitor operations of another computer in the network. After receiving requests to execute commands, automation server 101 may determine the operations to be executed based on the received commands and execute the commands accordingly.

Automation server 101 may implement a web service Application Programming Interface ("API"). The web service API may utilize a Representational State Transfer ("REST") architecture. Automation server 101 may receive requests for command execution from other computers on the network utilizing the web service API. For example, requests may be sent from mainframe computer 102, LINUX computer 103, PC computer 104 to automation server 101 to request the automation server 101 execute a specific command. The requests may be issued using Hypertext Transfer Protocol ("HTTP"). Automation server 101 may store a set of Uniform Resource Identifiers ("URI") each corresponding to a set of HTTP methods. Each of the stored URI's may be associated with an automation object for performing an operation. For example, the HTTP requests, e.g., GET and POST, may be issued against a published set of URI's. An HTTP request may comprise an Extensible Markup Language ("XML") document that may describe various parameters of the HTTP request. The web service API of automation server 101 may return a response comprising an XML document to provide the information that was requested. The XML documents used by the web service API may be defined by an XML schema stored in a memory 110 of automation server 101. The web service API may implement operations based on the requested commands. Accordingly, by utilizing the web service API, applications executed in different operating systems on different computers may send requests to automation server 101 to request execution of various commands. In another embodiment, automation server 101 may forward the request to a recipient device 105 in the network to execute the commands on the recipient device 105.

The present disclosure may enable an invoking application to send commands to a monitoring application, which may provide access to other computer systems in an enterprise-scale solution. Thus, the invoking application may utilize one API to run commands on different computer systems, e.g., different operating systems.

A user ID and password may be required in the API. These credentials may be used to confirm whether the program is authorized to execute its command on the target computer system. The API may be designed to operate using Transport Layer Security (TLS, e.g., SSL). Thus, all transmitted information, including user ID and password, may be securely encrypted.

Figure 2:
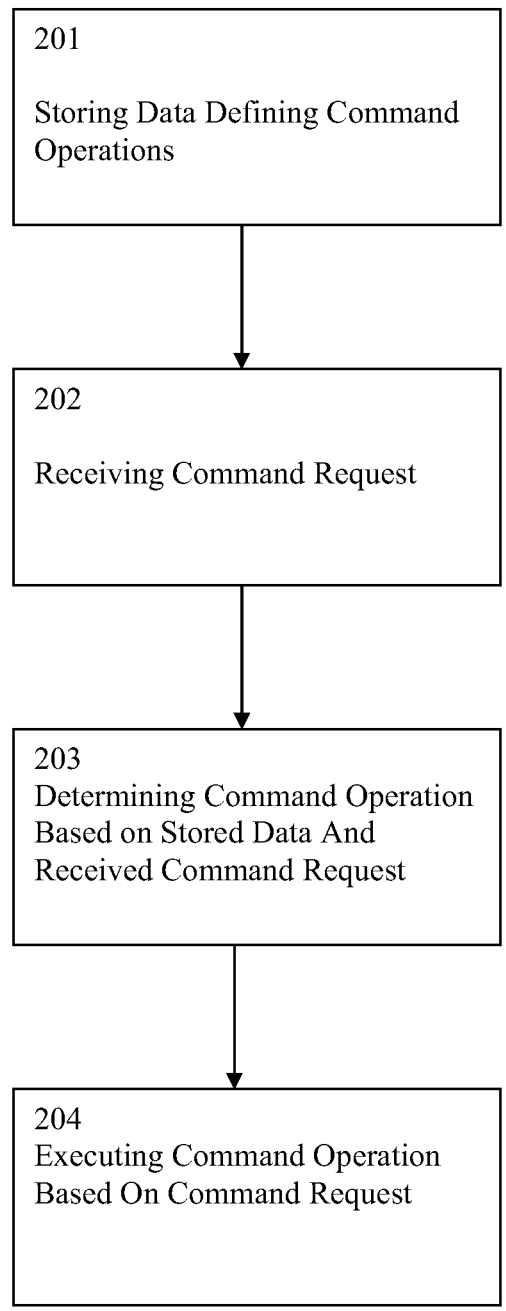
FIG. 2 is a flowchart depicting a command implementation process according to an embodiment of the disclosure.

Referring to FIG. 2, a command implementation process may be executed by automation server 101. At step 201, a pre-defined hierarchy of URI's may be stored in a memory 110 of automation server 101. Each of the URI's may represent automation object upon which operations are performed. The URI's may be specific to automation server 101, such that automation server 101 may be accessible to computers residing at a specific portion of the network. The may be similar to the URI's used in an internet browser, e.g., "http://www.ca.com." Information regarding which HTTP commands may be issued against a particular URI, and which operations each HTTP command may perform against a corresponding object may also be stored in memory 110 of automation server 101. Further, memory 110 may store XML schema defining XML documents that may be included in each HTTP request.

At step 202, automation server 101 may receive a request for command execution from a computer in the network. For example, one of mainframe computer 102, LINUX computer 103, and PC computer 104 may send a request to automation server 101 to execute a command. The request may be a RESTful HTTP command including an attached XML payload containing parameters for desired operations. A set of various XML documents may apply to each specific HTTP command issued against a specific URI.

At step 203, automation server 101 may interpret the received HTTP commands based on the URI and the XML documents enclosed in the HTTP commands. Automation server 101 may determine operations to be performed based on the URI and the XML documents. For example, automation server 101 may determine whether an HTTP command is valid by comparing the URI and XML documents enclosed in the HTTP command with the hierarchy of URI's and XML schema stored in memory 110. Automation server 101 may determine a proper response including reply XML documents to the HTTP command.

At step 204, automation server 101 may execute operations based on the received HTTP command. For example, when the received HTTP command is not valid, automation server 101 may reply with an XML error document indicating an error. Based on a valid HTTP command, automation server 101 may reply with an XML document supplying information requested by the requesting computer. For example, automation server may return an XML document indicating that a command was successfully transmitted to its target by automation server 101. Based on a valid HTTP command, automation server 101 may generate and forward a command to recipient device 105 to be executed at recipient device 105. Automation server 101 may execute various operations based on the received HTTP command.

URIs, HTTP Methods, and XML Documents

The HTTP command may comprise URI that may represent a resource of automation server 101 upon which operations may be performed. The meaning of an HTTP command may be determined by a specified URI. The HTTP command may identify the XML documents for the operations to be performed. An example of the base name of a URI targeted to the web service API of automation server 101 running under TOMCAT using Transport Layer Security ("TLS") may be:

https://localhost:8443/apwebsvc

This example base name may be used for all URI's listed in the following examples. Another host name may be used based on which computer an automation application is executed. Further, a site may be chosen to configure TOMCAT to use a non-default port number. In addition, during initial testing, a site may choose to avoid TLS for simplicity. Consequently, the HTTP scheme and the non-TLS default TOMCAT port of 8080 may be used.

Special characters may be introduced when specifying a query, which is expressed as part of the URI. When the URI contains such special characters, the URI may be enclosed in double quotes. For example, when requesting a list of all sessions that are automated, a GET request may be issued with a query:

https://localhost:8443/apwebsvc/sessions?Automated=yes

On the WINDOWS operating system executed on WINDOWS computer 102, the equals sign may be interpreted by the Windows Command Interpreter. The syntax may not be interpreted as a single URI parameter, and the command may fail. To prevent the WINDOWS operating system from misinterpreting this parameter, the parameter may be enclosed in double quotes:

"https://localhost:8443/apwebsvc/sessions?Automated=yes"

XML documents that may be identified in HTTP commands may be defined by corresponding XML schemas. In XML documents, web service API may utilize namespaces to avoid naming conflicts. The web service API namespace may be set as the default namespace in an attribute of the root element. Setting this attribute may allow all automation elements not to require qualifiers in this document. Each XML document may be validated against a corresponding XML schema that defines the XML document. The location of the XML schema may be specified as an attribute in the root element.

The following may be an example of the general format:

```
<?xml version="1.0" encoding="utf-8"?>
<YourXMLDocumentRootElement
    xmlns:xsi="http://www.w3.org/2001/XMLSchema-instance"
    xsi:schemaLocation="http://www.ca.com/distauto/ap/websvc/msgData
    XmlSchemaName.xsd"
    xmlns="http:www.ca.com/distauto/ap/websvc/msgData">
<ContentOfYourXMLDocument>
</YourXMLDocumentRootElement>
```

The XML schema name may change from one document to another.

The following example may execute the time command on a remote Windows computer:

```
<?xml version="1.0" encoding="utf-8"?>
<SessionCommand
    xmlns:xsi="http://www.w3.org/2001/XMLSchema-instance"
    xsi:schemaLocation="http://www.ca.com/distauto/ap/websvc/msgData
SessionCommand.xsd"
    xmlns="http://www.ca.com/distauto/ap/websvc/msgData">
    <Command>time /t</Command>
</SessionCommand>
```

Query String in URIs

An URI may comprise a query string. The may follow the "Uniform Resource Identifier (URI)" of RFC 3986. Thus, a query component may contain non-hierarchical data that, along with data in the path component, serves to identify a resource within the scope of the URIs scheme and naming authority (if any). The query component may be indicated by the first question mark ("?") character and terminated by a number sign ("#") character or by the end of the URI. Query components may be used to carry identifying information in the form of "key=value" pairs. Multiple query options may be applied when specifying a URI that accepts a query string. When specifying multiple query options, each option may be separated with an ampersand (&) character. An example is shown below:

URI-path?option1=value1&option2=value2

When an unknown query option is specified, the operation may return an HTTP status error of 400 (Bad Request) and the operation may return an error XML document. If a valid query option is specified, but the valid query is not applicable due to a conflict with another query option, the non-applicable option may be ignored and the operation may be processed.

Within some query strings, a pattern-matching expression may be used as the value of a query option. For example, a "." character may be used to mach any one character. A "*" character may be used to match any zero or more characters. A "\" character may serve as an escape character. A "\." character sequence may be used to match the "." character. A "\*" character may be used to match the "*" character. Further, a "\\" character may be used to match the "\" character. Other escape sequence may be treated as an error. For example, the string "AX\C" may be an invalid pattern.

The following are examples of URI's related to commands that may be processed by automation server 101, URI https:/localhost:8443/apwebsvc/sessions/<sessionName>

The above URI may represent a specific session which connects to a remotely monitored computer identified by session name.

The web service request POST sessions/<sessionName> may execute a command in a specific session. This web service request lay be valid for sessions that are connected to live, interactive sessions. Nevertheless, when the POST HTTP method is issued into a non-operational session, an HTTP status of 405, e.g., method not allowed, may be returned.

The web service request POST sessions/<sessionName> may not have query options. The HTTP request for POST sessions/<sessionName> may include a request XML document SessionCommand which is defined in XML schema SessionCommand.xsd. The following may be an example of the schema component representation of SessionCommand.

```
<xs:element name="SessionCommand">
  <xs:complexType>
    <xs:sequence>
      <xs:element name="Command" minOccurs="1"
        maxOccurs="1">
        <xs:complexType>
          <xs:simpleContent>
            <xs:extension base=" commandType ">
              <xs:attribute name="synchronous"
                default="yes">
                <xs:simpleType>
                  <xs:restriction base=" xs:string ">
                    <xs:enumeration value="yes"/>
                    <xs:enumeration value="no"/>
                  </xs:restriction>
                </xs:simpleType>
              </xs:attribute>
            </xs:extension>
          </xs:simpleContent>
        </xs:complexType>
      </xs:element>
    </xs:sequence>
  </xs:complexType>
</xs:element>
<xs:simpleType name="commandType">
  <xs:restriction base="xs:string">
    <xs:whiteSpace value="preserve"/>
  </xs:restriction>
</xs:simpleType>
```

The request may contain a command that is executed in a session which is the target of this HTTP method. By default, the command may be synchronous. Thus, the API may wait until the command has been transmitted to the monitored host. The command may selectively be set to be asynchronous. The "Command" element may contain the text of the session command. The "synchronous" attribute may specify if the command processing is executed synchronously or asynchronously. The possible values of the "synchronous" attribute may be:

yes=The processing is synchronous,
no=The processing is asynchronous.

The HTTP request headers for POST sessions/<sessionName> may comprise an Authorization header for supplying a user ID and password in the HTTP Basic Authentication format. The user ID may be a login name known to the automation server 101. The HTTP response headers for POST sessions/<sessionName> may comprise a status of 200 indicating a successful result for a synchronous command. A success of a synchronous command may indicate that the command has been transmitted to recipient device 105. A status of 202 may indicate a successful result for an asynchronous command. A success of an asynchronous command may indicate that the command has been accepted by automation server 101 for later transmission to recipient device 105. No reply document may be issued for web service request POST sessions/<sessionName>.

Using the above described HTTP commands including the URIs and XML documents, an invoking application executed on a remote system may send commands to a monitoring application and the monitoring application may forward the commands to other computer systems in an enterprise-scale solution. Thus, the invoking application may utilize one API to run commands on different computer systems, e.g., different operating systems.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for implementing commands, the method comprising:
storing data defining command operations in a memory, the data defining command operations comprising a hierarchy of Uniform Resource Identifiers (URIs) and Extensible Markup Language (XML) document schema defining XML documents, wherein each of the URIs represent an object upon which a command operation may be performed, wherein each XML document contains parameters for the command operations;
receiving a command request from a first remote computer, wherein the first remote computer is one of a plurality of remote computers, the command request comprising an URI and a Hypertext Transfer Protocol (HTTP) method;
determining whether the command request is valid by comparing the command request to the data defining command operations stored in the memory;
determining a selected command operation based on the comparison; and
sending the selected command operation for execution on a second remote computer distinct from the first remote computer, wherein the second remote computer is one of the plurality of remote computers.

2. The method according to claim 1, wherein the command request further comprises an XML document.

3. The method according to claim 1, wherein the HTTP method comprises an HTTP POST method, the URI identifies a session by a session name, and the XML document comprises a SessionCommand XML document; and
wherein sending the selected command operation comprises instructions to execute a command in the session identified by the session name.

4. The method according to claim 1, wherein the command request further comprises Hypertext Transfer Protocol (HTTP) headers comprising a user ID and a password in an HTTP Basic Authentication format.

5. The method according to claim 1, wherein the method further comprises sending a response comprising an XML document to the second remote computer in response to the command request.

6. The method according to claim 5, wherein the response comprises HTTP headers comprising a status indicating whether a synchronous command or an asynchronous command is successfully implemented.

7. The method according to claim 6,
wherein the status of a value "200" indicates that the synchronous command is transmitted to the second remote computer to be executed by the second remote computer,
wherein the status of a value "202" indicates that the asynchronous command is accepted for later transmission to the second remote computer.

8. The method according to claim 1, wherein the second remote computer executes the command operation on a different operating system than the first remote computer.

9. A computer for implementing commands, the computer comprising:
a processor; and
a non-transitory computer-readable storage medium storing computer-readable instructions, which when executed by the processor, cause the computer to perform:
storing data defining command operations in a memory, the data defining command operations comprising a hierarchy of Uniform Resource Identifiers (URIs) and Extensible Markup Language (XML) document schema defining XML documents, wherein each of the URIs represent an object upon which a command operation may be performed, wherein each XML document contains parameters for the command operations;
receiving a command request from a first remote computer, wherein the first remote computer is one of a plurality of remote computers, the command request comprising an URI and a Hypertext Transfer Protocol (HTTP) method;
determining whether the command request is valid by comparing the command request to the data defining command operations stored in the memory;
determining a selected command operation based on the comparison; and
sending the selected command operation for execution on a second remote computer distinct from the first remote computer, wherein the second remote computer is one of the plurality of remote computers.

10. The computer according to claim 9, wherein the command request further comprises an XML document.

11. The computer according to claim 9, wherein the HTTP method comprises an HTTP POST method, the URI identifies a session by a session name, and the XML document comprises a SessionCommand XML document; and
wherein sending the selected command operation comprises instructions to execute a command in the session identified by the session name.

12. The computer according to claim 9, wherein the command request further comprises Hypertext Transfer Protocol (HTTP) headers comprising a user ID and a password in an HTTP Basic Authentication format.

13. The computer according to claim 9, wherein the computer-readable instructions, which when executed by the processor, further cause the computer to perform:
sending a response comprising an XML document to the second remote computer in response to the command request.

14. The computer according to claim 13, wherein the response comprises HTTP headers comprising a status indicating whether a synchronous command or an asynchronous command is successfully implemented.

15. The computer according to claim 14,
wherein the status of a value "200" indicates that the synchronous command is transmitted to the second remote computer to be executed by the second remote computer,
wherein the status of a value "202" indicates that the asynchronous command is accepted for later transmission to the second remote computer.

16. The computer according to claim 9, wherein the second remote computer executes the command operation on a different operating system than the first remote computer.

* * * * *